United States Patent
Arunachalam et al.

(10) Patent No.: US 10,795,793 B1
(45) Date of Patent: Oct. 6, 2020

(54) METHOD AND SYSTEM FOR SIMULATING SYSTEM FAILURES USING DOMAIN-SPECIFIC LANGUAGE CONSTRUCTS

(71) Applicant: INTUIT INC., Mountain View, CA (US)

(72) Inventors: Balaji Arunachalam, San Diego, CA (US); Surya Madhuri Telikepalli, San Diego, CA (US); Samer Abdulaziz, San Diego, CA (US); Ammar Almekhiafi, San Diego, CA (US); Zeeshan Ahmad Anwar, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 67 days.

(21) Appl. No.: 16/194,472

(22) Filed: Nov. 19, 2018

(51) Int. Cl.
  *G01R 31/28* (2006.01)
  *G06F 11/00* (2006.01)
  *G06F 11/26* (2006.01)
  *G06F 11/263* (2006.01)
  *G06F 11/34* (2006.01)
  *G06F 11/07* (2006.01)

(52) U.S. Cl.
  CPC ........ *G06F 11/261* (2013.01); *G06F 11/0709* (2013.01); *G06F 11/263* (2013.01); *G06F 11/3476* (2013.01); *G06F 2201/875* (2013.01)

(58) Field of Classification Search
  CPC .. G06F 11/0709; G06F 11/263; G06F 11/261; G06F 11/3476
  See application file for complete search history.

(56) References Cited

U.S. PATENT DOCUMENTS

| | | | | |
|---|---|---|---|---|
| 6,272,671 B1 * | 8/2001 | Fakhry | .................... | G06F 30/30 716/103 |
| 6,370,493 B1 * | 4/2002 | Knapp | .................... | G06F 30/33 703/14 |
| 2002/0188892 A1 * | 12/2002 | Lajolo | ........................ | H04L 1/24 714/42 |
| 2003/0217341 A1 * | 11/2003 | Rajsuman | ........ | G01R 31/31813 324/750.01 |
| 2004/0078175 A1 * | 4/2004 | Shaw | ............. | G01R 31/318328 703/14 |

(Continued)

*Primary Examiner* — Guerrier Merant
(74) *Attorney, Agent, or Firm* — Patterson + Sheridan, LLP (57) ABSTRACT

Certain aspects of the present disclosure provide techniques for executing simulated failure scenarios on a computing system using natural language inputs in a domain-specific language. Embodiments includes receiving a failure scenario definition, which may be a natural language input identifying target systems in a distributed computing system, properties, and an expected outcome of a simulated system failure. Commands directed to the identified target systems to simulate a system failure on the identified systems according to the identified properties are generated and transmitted to the identified target systems for execution. The outcome of the simulated system failure is monitored, recorded, and compared to the expected outcome of the simulated system failure. Upon determining that the recorded outcome and expected outcome of the simulated system failure differ, an alert identifying a difference between the recorded outcome and the expected outcome is generated.

20 Claims, 6 Drawing Sheets

(56) References Cited

U.S. PATENT DOCUMENTS

2017/0242784 A1* 8/2017 Heorhiadi .......... H04L 41/5038
2018/0004880 A1* 1/2018 Sattiraju ............... G06F 30/367
2019/0354454 A1* 11/2019 Shmouely .......... G06F 11/2733

* cited by examiner

METHOD AND SYSTEM FOR SIMULATING SYSTEM FAILURES USING DOMAIN-SPECIFIC LANGUAGE CONSTRUCTS

INTRODUCTION

Aspects of the present disclosure generally relate to performing failure testing of computing systems, and more specifically to using domain-specific language constructs defining simulated failure scenarios to perform failure testing of a computing system.

BACKGROUND

Applications may be implemented as a collection of services that work together to perform a specified task. In these applications, the services that are deployed to implement the functionality of the application may be hosted on different computing devices, such as physical servers, virtual servers executing in a virtualized environment, server pools, distributed computing environments, dynamically load-balanced cloud computing environments, or other computing environments. The functionality of the overall application may be adversely affected by unavailability or degraded performance of specific computing systems on which services may execute. For example, unavailability of a specific service may cause certain functions of an application to be partially or wholly unavailable for use by users of the application. In another example, degraded performance of a specific service, which may include performance degradation from network latencies, non-responsive computing services, spinlock scenarios, or other scenarios in which a computing system is available but unresponsive, may cause time-out events or other failures in an application. In some cases, applications may include recovery measures that attempt to recover from system failures or degraded performance of various services used by an application. These recovery measures may include, for example, re-instantiating services on different servers (physical or virtual), migrating execution of services to different pools of servers, re-instantiating load balancers or other infrastructure components that orchestrate execution of the application, terminating and re-instantiating unresponsive services executing on a server, and the like.

To ensure that an application can successfully recover from various errors or system failures, developers may perform failure testing on the application prior to releasing the application for use in a production environment. The failure testing may be performed according to a failure mode effects analysis (FMEA) methodology in which potential failure modes (e.g., points of failure in an application, causes of system failure, etc.) are identified, simulated, and analyzed. In a software system, execution of a failure scenario may be performed by manually injecting failures into a test system to generate a simulated failure scenario and observing the results of the simulated failure scenario. Generating these failure scenarios, however, may be a time-intensive, manual process that may fail to identify potential failure scenarios or identify whether an application successfully recovered from a simulated failure scenario. FMEA testing may involve manually generating test cases using personnel from multiple teams (e.g., network engineers, performance engineers, developers, quality engineers, database administrators, etc.) in order to define the parameters of each test case, and execution of the test cases may take up to five days to complete. In some cases, where tests need to be repeated for regression testing, FMEA testing may involve even greater amounts of time. Further, because developers may only have knowledge of how to conduct a particular portion of an FMEA test, it may be difficult for individual developers to independently perform FMEA tests on an application or components of an application.

Accordingly, techniques are needed to perform robust failure testing on computing systems.

BRIEF SUMMARY

Certain embodiments provide a computer-implemented method for executing failure tests in a distributed computing environment. The method generally includes receiving a failure scenario definition defining a simulated failure scenario to execute on the distributed computing system. The failure scenario definition may be a natural language input identifying target systems in the distributed computing system of a simulated system failure, properties of the simulated system failure, and an expected outcome of the simulated system failure. A failure testing system generates commands directed to each of the identified systems to simulate a system failure on the identified systems according to the identified properties and transmits the generated commands to each of the identified systems for execution. The failure testing system monitors the distributed computing system to record an outcome of the simulated system failure and compares the recorded outcome of the simulated system failure to the expected outcome of the simulated system failure. Upon determining that the recorded outcome and expected outcome of the simulated system failure differ, the failure testing system generates an alert identifying a difference between the recorded outcome and the expected outcome.

Other embodiments provide a system comprising a processor and a non-transitory computer-readable memory storing instructions that, when executed by the processor, perform an operation for executing failure tests in a distributed computing environment. The operation generally includes receiving a failure scenario definition defining a simulated failure scenario to execute on the distributed computing system. The failure scenario definition may be a natural language input identifying target systems in the distributed computing system of a simulated system failure, properties of the simulated system failure, and an expected outcome of the simulated system failure. A failure testing system generates commands directed to each of the identified systems to simulate a system failure on the identified systems according to the identified properties and transmits the generated commands to each of the identified systems for execution. The failure testing system monitors the distributed computing system to record an outcome of the simulated system failure and compares the recorded outcome of the simulated system failure to the expected outcome of the simulated system failure. Upon determining that the recorded outcome and expected outcome of the simulated system failure differ, the failure testing system generates an alert identifying a difference between the recorded outcome and the expected outcome.

Still further embodiments provide a computer-readable medium having instructions stored thereon which, when executed, performs an operation for executing failure tests in a distributed computing environment. The operation generally includes receiving a failure scenario definition defining a simulated failure scenario to execute on the distributed computing system. The failure scenario definition may be a natural language input identifying target systems in the distributed computing system of a simulated system failure, properties of the simulated system failure, and an expected outcome of the simulated system failure. A failure testing system generates commands directed to each of the identified systems to simulate a system failure on the identified systems according to the identified properties and transmits the generated commands to each of the identified systems for execution. The failure testing system monitors the distributed computing system to record an outcome of the simulated system failure and compares the recorded outcome of the simulated system failure to the expected outcome of the simulated system failure. Upon determining that the recorded outcome and expected outcome of the simulated system failure differ, the failure testing system generates an alert identifying a difference between the recorded outcome and the expected outcome.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for performing failure testing on an application using natural language inputs. The natural language inputs may be a domain-specific language in which a simulated failure scenario is defined, for example, as a type of failure to be executed on an identified target server and/or service, properties of the simulated failure, and expected results of the simulated failure. A failure analysis system receives the natural language inputs defining a failure scenario, translates the natural language inputs into executable code that executes the identified type of failure according to the properties of the simulated failure, and monitors a computing system for the outcome of the simulated failure. The failure analysis system compares the outcome of the simulated failure to an expected outcome of the simulated failure to determine whether the application responded to the simulated failure in an expected manner. If the application responded to the simulated failure scenario in the expected manner, the failure analysis system can determine that no action need be taken with respect to the application and the simulated failure scenario. If, however, the failure analysis system determines that the application did not respond to the simulated failure scenario in the expected manner, the failure analysis system can flag the simulated failure scenario for further review by a development team. In some embodiments, the failure analysis system may further take action to prevent code under development from being deployed to a production environment or revert code deployed in a production environment to a previous version known to be stable and responsive to the simulated failure scenario in the expected manner.

By utilizing natural language formats to allow developers to define simulated failure scenarios and expected outcomes of the simulated failure scenarios, embodiments of the present disclosure allow developers of a software application to perform robust testing of elements of an application. Developers can execute a simulated failure scenario without manually writing code to invoke the simulated failure scenarios or needing to know specific information about the computer systems on which portions of an application are deployed in order to simulate a failure scenario. Further, the natural language inputs defining simulated failure scenarios may include information defining expected results of the simulated failure scenario, which may facilitate automated verification of application functionality during and after recovery from the simulated failure scenario. By automating the verification of application functionality as part of the simulated failure scenario, embodiments of the present disclosure may improve software quality by blocking application code that does not respond to the simulated failure scenario in the expected manner from deployment to a production environment or by reverting deployments of non-performing code in a production environment.

Figure 1:
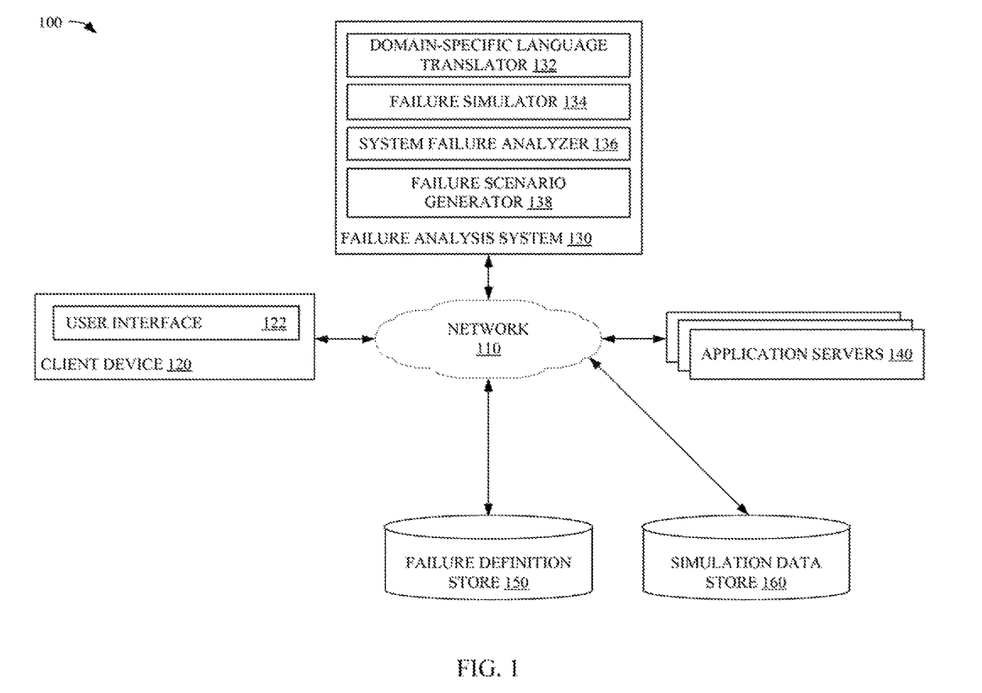
FIG. 1 depicts an example networked environment in which domain specific language inputs defining a simulated failure scenario are used to perform failure testing on a computing system

Example Application Failure Testing Through Natural Language Inputs Defining a Failure Scenario FIG. 1 illustrates a networked environment 100 in which natural language inputs defining simulated failure scenarios are used to perform failure mode testing on an application executing in a distributed computing environment, according to an embodiment. As illustrated, networked environment 100 includes a client device 120, a failure analysis system 130, application servers 140, a failure definition store 150, and a simulation data store 160, connected via network 110.

Client device 120 is generally representative of a variety of devices that can interact with failure analysis system 130 to define and execute simulated failure scenarios against one or more of application servers 140. Client device 120 may be, without limitation, laptop computers, desktop computers, thin clients, tablet computers, mobile computing devices, and the like.

As illustrated, client device 120 includes a user interface 122. User interface 122 allows a user of client device 120 to interact with failure analysis system 130 to define and execute simulated failure scenarios against the one or more application servers 140. In some embodiments, user interface 122 may display a text editing interface or other management console provided by failure analysis system 130 to define failure scenarios and begin execution of a simulated failure scenario. In some embodiments, user interface 122 may additionally or alternatively allow a user to interact with a failure scenario generator 138 on failure analysis system 130 to generate a simulated failure scenario, which may be a randomized scenario used to test an application for any number of system failures with any degree of severity. These randomized scenarios may be used in an overall chaos engineering testing approach in which failures of any degree of severity are tested in a controlled environment to test how an application responds to multiple random failures occurring on the one or more application servers 140 hosting different services used by an application.

In some embodiments, user interface 122 may include a conversational interface that allows a user to interact with chatbots or other artificial agents in a conversational interface. The conversational interface may, for example, allow for user input of information defining simulated failure scenarios, extensions to existing failure scenarios, and the like via textual input (e.g., text messages transmitted via SMS, instant messaging applications, etc.), audio input translated to textual commands, or other input systems. In some embodiments, user interface 122 may execute on client devices 120 that may include limited mechanisms by which commands are input into client device 120 for execution and the results of those commands are presented to a user of client device 120. These user interfaces 122 may include virtual assistants that execute as services in the cloud via commands received at a client device 120 and interpreted via the services associated with these virtual assistants.

In some embodiments, users may be able to extend the failure scenarios defined for use in FMEA testing on an application executing on application servers 140. To allow for the addition of new tests or modification of existing tests, user interface 122 may allow users to define new failure scenarios and mappings between a natural language input and code for executing a failure scenario. A text editor or other development environment may allow software developers using client system 120 to write executable code (e.g., code in Java, JavaScript, PHP, or other languages) for executing a simulated failure scenario, define a domain-specific, natural language input for the failure scenario, and commit the mapping between the domain-specific language input and the executable code to failure definition store 150. As described in further detail herein, failure analysis system 130 can use mappings defined between a format of a domain-specific language input and the executable code to generate commands for executing a simulated failure scenario.

Failure analysis system 130 generally orchestrates execution of a simulated failure scenario against one or more application servers 140, monitors the application servers 140 during execution of the simulated failure scenario, and takes actions based on the results of the simulated failure scenario. As illustrated, failure analysis system 130 generally includes domain-specific language translator 132, failure simulator 134, system failure analyzer 136, and failure scenario generator 138.

Domain-specific language translator 132 generally receives a natural language input defining a simulated failure scenario and generates commands to execute the simulated failure scenario according to the natural language input. In some embodiments, domain-specific language translator 132 may be pre-configured to translate a received natural language input to a set of commands to be executed against one or more of the application servers 140. In some embodiments, where mappings between natural language domain-specific inputs and commands may be added or modified over time, domain-specific language translator 132 can retrieve a mapping between a received natural language input and executable code for executing a simulated failure scenario from failure definition store 150. In some embodiments, the natural language input may include a full specification of a simulated failure scenario.

In some embodiments, domain-specific language translator 132 may receive information identifying a failure scenario to execute and values defining properties the identified failure scenario. Based on the information identifying the failure scenario to execute and the values to insert, domain-specific language translator 132 may retrieve the template associated with the identified failure scenario from a repository (e.g., failure definition store 150) and generate a simulated failure scenario definition by inserting the values included in the received information into identified placeholders in the template.

The natural language input received by domain-specific language translator 132 from a client device 120 generally identifies one or more failures to inject into an application executing on one or more application servers 140, the properties of the failures to be injected into the application, and an expected outcome of the simulated failure scenario represented by the natural language input. In some embodiments, the expected outcome of the simulated failure scenario may include an expected state of the application servers 140 on which application components execute after injection of the failure into the specified application servers to verify that the system has failed according to the failures identified in the natural language input and an expected state of the application servers 140 after recovery operations have been invoked on the application servers 140. The properties of the failures to be injected into the application may include, for example, information identifying the application servers 140 or other resources to execute a failure on, an amount of time to wait before verifying that the specified failure was successfully injected into the application, an amount of time to wait after initiating recovery processes before verifying that the application has recovered from a simulated failure scenario, numbers of active application servers or other resources allocated to executing or orchestrating execution of the application, and other parameters that may be appropriate for simulating a failure scenario on application servers 140.

Based on a mapping between the received natural language input defining a simulated failure scenario and code for executing the simulated failure scenario, domain-specific language translator 132 generates one or more commands to execute the failure scenario. The mappings between received natural language inputs and code for executing the simulated failure scenario may be configured for any distributed computing environment that may host an application so that failure analysis system 130 may be used to simulate failure scenarios in a variety of computing environments, such as Amazon Web Services, Microsoft Azure, other infrastructure-as-a-service (IAAS) environments, and self-hosted computing environments.

The generated commands may be a set of commands to be executed sequentially to inject one or more failures into a distributed computing environment on which an application executes, pauses to inject into the simulated failure scenario, and assertion statements to compare the actual outcome of the simulated failure scenario to an expected outcome of the simulated failure scenario.

The assertions used to compare the actual outcome of the simulated failure scenario to the expected outcome of the simulated failure scenario may be used to break execution of a simulated failure scenario if the actual and expected outcomes of the simulated failure scenario do not match. As discussed in further detail below, the failure of an assertion may generate an output indicating that the simulated failure scenario failed to execute successfully, which may then be used to block deployment of application source code to a production environment, revert deployment of application source code in a production environment, generate alerts identifying failure scenarios that failed, and other actions that may be performed in response to a failure of a simulated failure scenario.

Failure simulator 134 receives the commands generated by domain-specific language translator 132 and transmits the commands to the one or more application servers 140 and/or other infrastructure components for execution. Generally, the commands generated by domain-specific language translator 132 and transmitted to application servers 140 for execution may include commands to remove an application server 140 or other infrastructure component (e.g., load balancers, storage components, virtualized networking components, scalers, etc.) from the set of components used to execute application services, simulate increased network latencies on specified application servers 140, simulate spinlocks or other high processor utilization scenarios on specified application servers 140, terminate processes on an application server 140, and other scenarios that may arise in a system failure scenario. After transmitting commands to the application servers 140 to inject simulated failures into the application servers 140 in a distributed computing system, failure simulator 134 may subsequently transmit one or more commands to initiate a recovery process from the simulated failures. In some embodiments, failure simulator 134 may transmit these commands to initiate a recovery process after a waiting period included in the natural language input defining the simulated failure scenario, and in some embodiments, the recovery process may be initiated upon determining that the generated commands to inject a simulated failure into the distributed computing system successfully executed.

System failure analyzer 136 generally monitors the application servers 140 during and after execution of a simulated system failure to determine whether a simulated system failure executed successfully and whether the application servers 140 in a distributed computing environment on which an application executes successfully recovered from the simulated system failure. In some embodiments, system failure analyzer 136 may use assertions to break execution of a simulated system failure if the actual outcome of a simulated system failure does not match the expected outcome of a simulated system failure. For example, if a simulated system failure was introduced to simulate a server failure in the distributed computing environment, system failure analyzer 136 may compare the number of active servers in the distributed computing environment to an expected number of active servers (e.g., the number of servers prior to the simulated system failure, less the number of servers identified in the natural language input to remove from the distributed computing environment) to determine whether the server failure was injected into the distributed computing environment. In another example, if a simulated system failure was introduced to simulate a spinlock or other high processor utilization scenario on a specified application server 140, system failure analyzer 136 may determine whether the specified application server 140 is in a spinlock or high processor utilization scenario by determining whether the specified application server 140 responds to status requests transmitted by system failure analyzer 136. If commands to introduce a simulated failure into the distributed computing environment fail to actually introduce the simulated failure into the computing environment, attempting to recover from the system failure may waste computing resources in testing an incomplete failure because part or all of the simulated system failure did not actually execute. Thus, system failure analyzer 136 may halt execution of the simulated system failure prior to execution of commands to recover from the simulated system failure. In some embodiments, system failure analyzer 136 may further generate an alert informing a developer that the code for introducing the simulated system failure failed to do so.

After determining that the simulated system failure was successfully introduced into the distributed computing environment and allowing failure simulator 134 to proceed with executing recovery processes from the simulated system failure, system failure analyzer 136 monitors application servers 140 in the distributed computing environment to determine whether the distributed computing environment successfully recovered from the simulated system failure. In some embodiments, system failure analyzer 136 may request system status information from application servers 140 or other infrastructure components on which the simulated system failure executed.

For example, in a scenario where the simulated system failure simulates a server failure, system failure analyzer 136 may determine whether the distributed computing environment successfully recovered from the simulated system failure by comparing the number of active servers in the distributed computing environment prior to execution of the simulated system failure to the number of active servers in the distributed computing environment after execution of recovery processes in the distributed computing environment. If the number of servers prior to and after execution of the simulated system failure and recovery processes match, system failure analyzer 136 can determine that the recovery processes executed successfully. Otherwise, system failure analyzer 136 can determine that the recovery processes failed to successfully recover the distributed computing environment from the simulated failure scenario.

In another example, where the simulated system failure simulates a spinlock, high processor utilization, or degraded network connectivity scenario on a specific application server, system failure analyzer 136 may determine whether the distributed computing environment recovered from the simulated system failure by determining whether the targeted application server 140 was replaced or otherwise responds to status requests from system failure analyzer 136 prior to a timeout period. If the targeted application server responds to a status request within the specified timeout period, system failure analyzer 136 can determine that the distributed computing environment successfully recovered from the simulated system failure; however, if a replacement server is not detected or the targeted application server does not respond within a timeout period, system failure analyzer 136 can determine that the distributed computing system failed to recover from the specified system failure.

If system failure analyzer 136 determines that the distributed computing system failed to recover from a simulated system failure, system failure analyzer 136 may take one or more actions to inform a user of client device 120 of the failed simulated system failure(s). In some embodiments, system failure analyzer 136 can inform the user of client device 120 of the failure to successfully execute a simulated system failure by displaying an alert or notification in user interface 122, generating and sending an e-mail message to a developer, generating and sending a Short Messaging Service (SMS) or Multimedia Messaging Service (MMS) message to a developer, or other messages or alerts that may be transmitted to a developer device for display.

In some embodiments, system failure analyzer 136 may additionally be integrated with software development pipelines and deployment systems to control deployment of versions of an application to a production environment. Upon determining that an application executing on the distributed computing system was unable to successfully recover from the simulated system failure, system failure analyzer 136 may block the code associated with the software application from promotion to another stage of the software development pipeline or deployment to a production system. In some embodiments, where failure analysis system 130 is used to simulate system failures on a production version of an application, system failure analyzer 136 can revert the application to a previous production version of the application that has previously been tested against various simulated failure scenarios.

In some embodiments, system failure analyzer 136 may be configured to aggregate test data from multiple simulated failure scenarios to generate reports or other visualizations illustrating how an application executing in a distributed computing environment responded to various simulated failure scenarios. The reports or other visualizations may include information identifying the simulated failure scenarios executed against the application in the distributed computing environment, the percentage of simulated failure scenarios that the application recovered successfully from, the percentage of simulated failure scenarios that the application failed to successfully recover from, criticality information about each of the simulated failure scenarios, and the like. In some embodiments, the reports or other visualizations generated by system failure analyzer 136 may display a prioritized list of simulated failure scenarios based on a defined impact factor associated with each simulated failure scenario that the application did not successfully recover from. By displaying simulated failure scenarios that the application did not successfully recover from, system failure analyzer 136 can generate reports that allow software developers to focus development efforts on handling system failure scenarios having the highest potential negative impact on application performance and reliability if such errors occur on a production system.

Failure scenario generator 138 is generally configured to generate randomized failure scenarios to simulate against the application servers 140 comprising the distributed computing environment in which an application executes. These randomized failure scenarios may be an amalgamation of multiple discrete failure scenarios defined in failure definition store 150. A developer may instruct failure scenario generator 138 to generate a randomized failure scenario through a management console exposed by failure scenario generator 138 and displayed on client device 120 via user interface 122. The instructions may include, for example, instructions to amalgamate system failures from selected categories of failures, instructions to select a random number of any type of failure to amalgamate, and an expected outcome of simulated amalgamated system failure. By generating randomized failure scenarios to simulate against the distributed computing environment, failure scenario generator 138 can test an application to determine if the application is able to recover from a chaotic failure scenario in which multiple application servers 140 and/or other application components fail substantially simultaneously.

Application servers 140 generally host applications or components of an application that serve content to a user on an endpoint device and process user input received from the endpoint device. In some embodiments, the application components may be implemented and deployed across a number of application servers 140 in a distributed computing environment. These application components may be services or microservices that, together, expose the functionality of an application to users of the application. The application servers 140 may host components that may be shared across different applications. In some embodiments, the application servers 140 may additionally include infrastructure components used to manage the distributed computing environment in which an application executes.

Failure definition store 150 generally provides an updateable repository in which mappings between natural language, domain-specific inputs defining a simulated failure scenario and the code for executing those simulated failure scenarios against the one or more application servers 140 are stored. In some embodiments, failure definition store 150 may additionally include templates defining the format of a natural language input defining a failure scenario, mapped to a name of the simulated failure scenario and the executable code for executing the failure scenario. Failure definition store 150 may be a relational database, a non-relational database, or other data store that is searchable and may be used to information defining natural language inputs and commands to be generated and executed against the application servers 140.

Simulation data store 160 generally provides a repository in which the results of simulated failure scenarios are stored. Generally, as failure analysis system 130 executes simulated failure scenarios against application servers 140, failure analysis system can commit information to simulation data store 160 in which a specific execution of a failure scenario is associated with an identifier (e.g., a session identifier identifying a specific batch of simulated failure scenarios being executed), the name or other identifier of the simulated failure scenario that was executed, and a result of the simulated failure scenario (e.g., pass/fail data for the scenario). The data stored in simulation data store 160 may be used to generate reports or other visualizations illustrating how an application responded to a suite of simulated failure scenarios and prioritization information for addressing failed scenarios.

Figure 2:
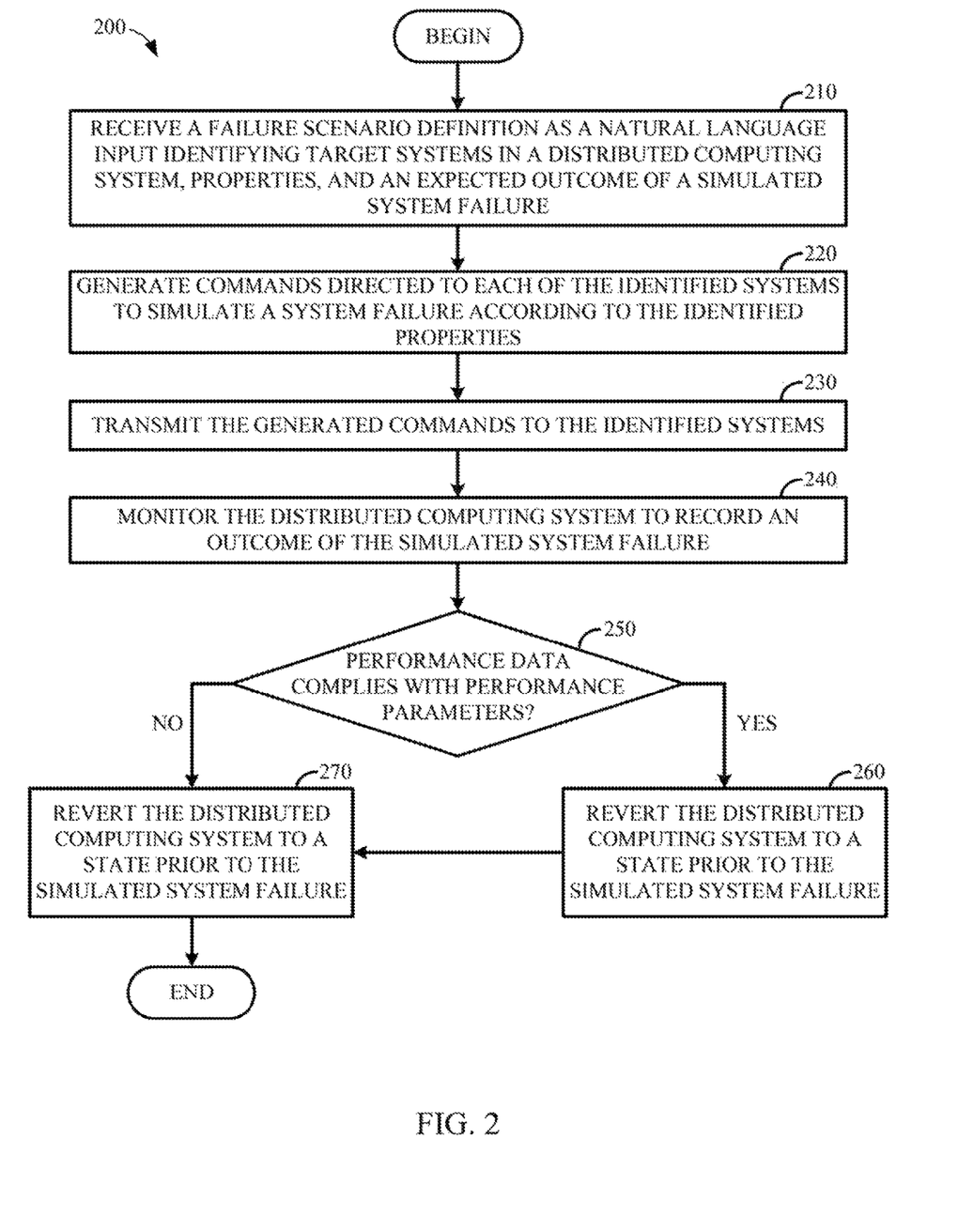
FIG. 2 illustrates example operations for performing failure testing on a computing system using a domain specific language definition of a simulated failure scenario.
Figure 4:
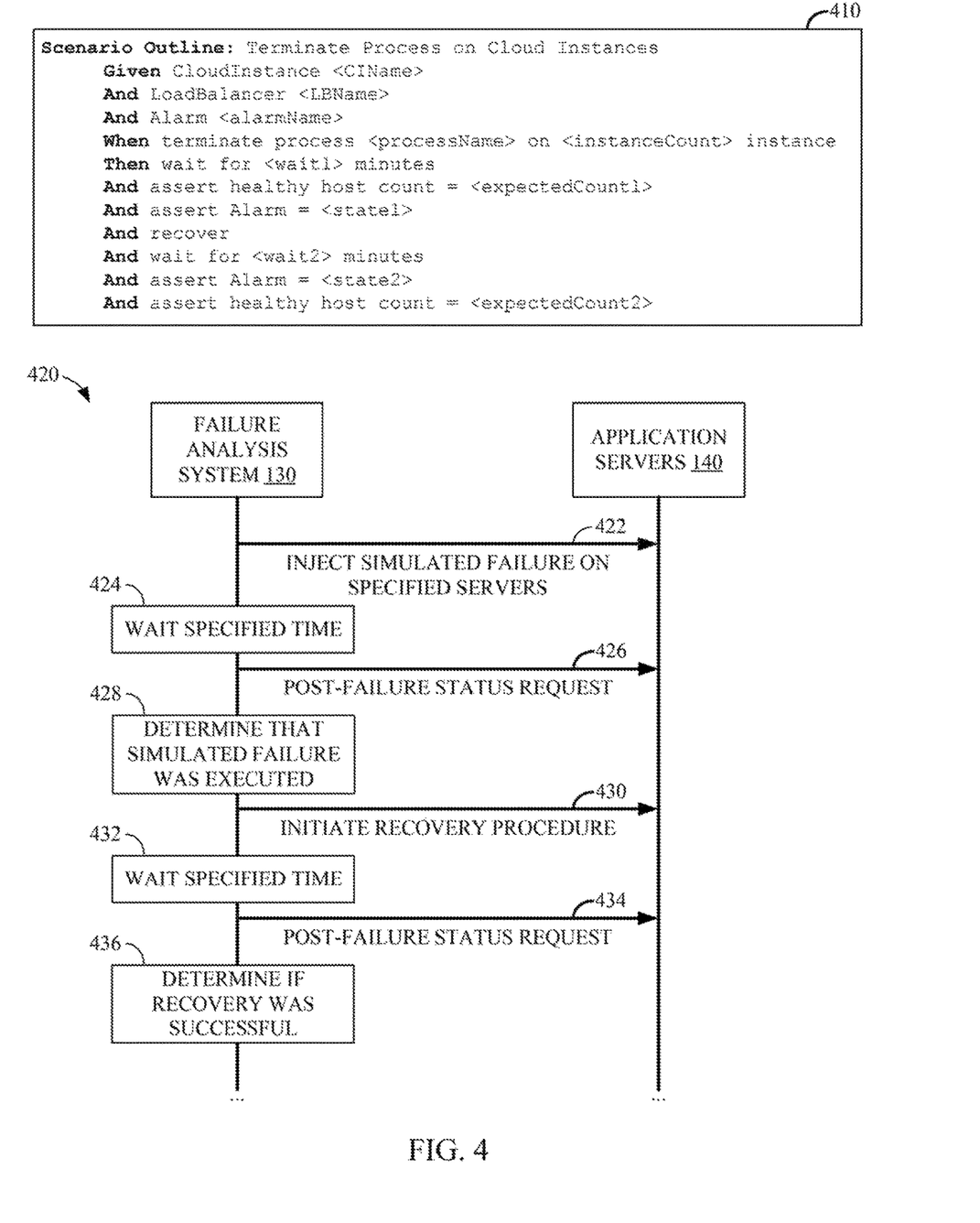
FIG. 4 illustrates an example domain specific language definition of a simulated failure scenario and a message flow diagram of messages transmitted and operations performed to execute the simulated failure scenario.

Example Computer Implemented Method for Application Failure Testing Through Natural Language Inputs Defining a Failure Scenario FIG. 2 illustrates example operations 200 for performing application failure testing from natural language, domain-specific inputs defining a failure scenario, according to an embodiment of the present disclosure. FIG. 4 illustrates an example of a natural language, domain-specific input that may be used to initiate execution of a simulated failure scenario.

As illustrated, operations 200 begin at block 210, where a system receives a failure scenario definition as a natural language input. The failure scenario definition generally identifies target systems in a distributed computing system on which a simulated system failure is to be executed, properties of the simulated system failure, and an expected outcome of the simulated system failure. In some embodiments, as discussed above, the failure scenario definition may be generated from a user input requesting the generation of a specific named failure scenario according to specific parameters defining the named failure scenario. The failure scenario definition may, in some embodiments, be generated from a template associated with the named failure scenario, and placeholders in the template may be replaced with the parameters defining the named failure scenario. These parameters may include, for example, a target application server 140 or infrastructure component to simulate a failure on, an amount of time to wait before verifying that the failure was actually simulated on the target application server 140 or infrastructure component, an amount of time to wait after initiating recovery operations before verifying whether the system successfully recovered from the simulated failure scenario, and other appropriate parameters. In some embodiments, as discussed above, the received failure scenario may be a random failure scenario generated by failure scenario generator 138 to test the robustness of an application against a random system failure defined as an amalgamation of multiple discrete system failures.

At block 220, the system generates commands directed to each of the identified systems to simulate a system failure according to the identified properties in the failure scenario definition. The system can generate the commands to execute a simulated failure scenario based on a mapping between domain-specific natural language inputs and executable code for a simulated failure scenario. The mappings may, for example, map specific keywords in the natural language input to specific actions to perform and may map words or phrases after these specific keywords to the parameters of a specific action to be performed (e.g., parameters to be provided in a function call to invoke an action against one or more application servers 140 that are to be tested).

At block 230, the system transmits the generated commands to the identified systems. These identified systems may include one or more of application servers 140 and/or infrastructure components of a distributed computing environment in which the application servers 140 execute. In some embodiments, the system may sequentially transmit the commands to invoke a simulated system failure to each of the identified systems prior to a first waiting period for verifying that the simulated system failure was invoked successfully. In some embodiments, such as when a simulated failure scenario is used to simulate simultaneous or near-simultaneous occurrences of different events, the commands to invoke the simulated system failure may be transmitted in parallel or substantially in parallel such that the simulated failures may occur substantially simultaneously. After verifying that the simulated system failure was successfully invoked, the system can generate the generated commands to initiate recovery processes to the identified systems.

At block 240, the system monitors the distributed computing system to record an outcome of the simulated system failure. In some embodiments, monitoring the distributed computing system to record an outcome of the simulated system failure may include requesting status messages from one or more application servers 140 and/or infrastructure components, requesting information about a number of servers included in the distributed computing system for hosting an application or application services, and other monitoring to determine if services, application servers, and infrastructure components are responsive.

At block 250, the system determines whether the monitored outcome matches the expected outcome of the simulated system failure. The monitored outcome may match the expected outcome, for example, if the monitored and expected outcomes of the simulated system failure match. For example, the recorded outcome and expected outcome of the simulated system failure may be a state of an alert message. After recovery operations have been initiated, the expected outcome may be an alert message with a status of "OK." If the recorded outcome is some value other than a status of "OK," which indicates that an error condition still exists in the distributed computing environment, the system can determine that the monitored outcome of the simulated system failure does not match the expected outcome of the simulated system failure, at block 260, the system generates an alert identifying a difference between the recorded outcome and the expected outcome. In another example, the recorded outcome and expected outcome for the simulated system failure may be a number of active application servers in the distributed computing system. A mismatch between the number of active application servers and an expected number of active application servers generally indicates that recovery operations on the distributed computing environment failed, and operations 200 may thus proceed to block 260.

As discussed, block 260 may be reached, for example, if an assertion that the monitored outcome matches the expected outcome fails. In some embodiments, the system may proceed to take proactive or remedial action with respect to the application code being tested to prevent code in a development stage of the software development pipeline from being promoted or reverting a promotion of code to a production environment so that code that has been tested to respond in the expected manner to a failure scenario is made available in the production environment. Operations 200 may proceed to block 270, where the system reverts the distributed computing system to a state prior to the simulated system failure. Generally, reverting the distributed computing system to a state prior to the simulated system failure may include terminating an instance of the distributed computing system (e.g., in a cloud computing environment), restarting physical servers and other infrastructure components in the distributed computing system, terminating and restarting services executing on a computing service, or other actions that may be taken to reset the distributed computing environment to a known state.

If, at block 250, the system determines that the monitored outcome of the simulated system failure matches the expected outcome, operations 200 proceed to block 270 to revert the distributed computing system to the pre-simulated system failure state.

Figure 3:
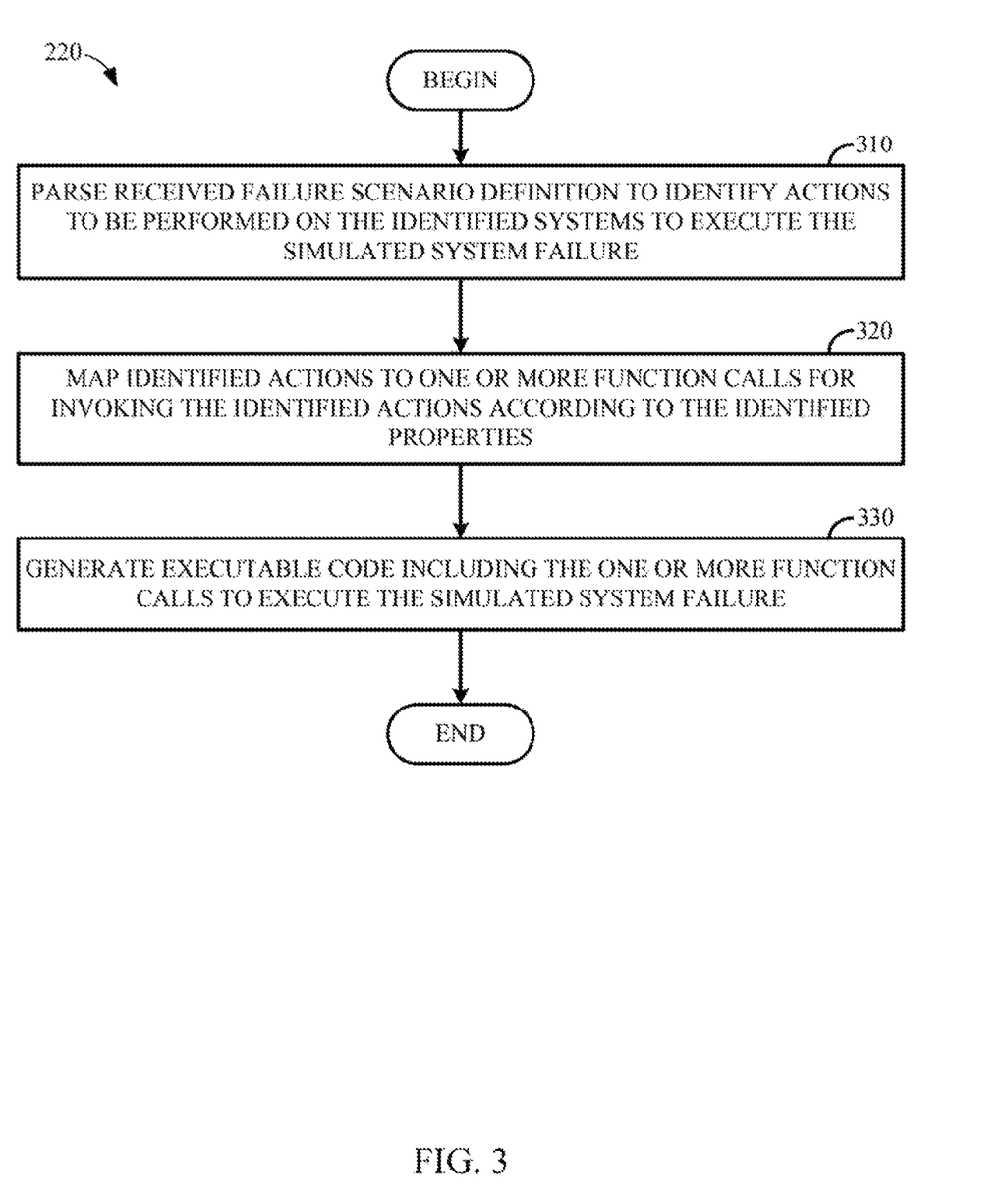
FIG. 3 illustrates example operations for generating commands to execute a simulated system failure from a received domain specific language definition of a simulated failure scenario.

FIG. 3 illustrates example operations 220 for generating commands to simulate a system failure, according to an embodiment. As illustrated, operations 220 may begin at block 310, where a system parses a received failure scenario definition to identify actions to be performed on the identified systems to execute the simulated system failure. As discussed, various key words in the received failure scenario definition, which may be received in a domain-specific, natural language format, may be mapped to actions to perform on one or more application servers or infrastructure components, time to wait between execution of different commands, and comparisons to perform between the monitored and expected outcomes of the simulated failure scenario defined by the failure scenario definition so that the natural language input may be translated to commands executable against application server 140 of FIG. 1 and/or other infrastructure components in a distributed computing environment, as discussed above. The key words associated with actions to perform on the one or more application servers, and the parameters associated with those keywords, may be extracted from the received failure scenario definition for generating executable code to invoke the simulated system failure.

At block 320, the system maps the identified actions to one or more function calls for invoking the identified actions according to the identified properties. The mappings may be defined in a database or other searchable data structure that maps key words associated with actions to perform in the distributed computing system to function calls for invoking the identified actions.

At block 330, the system generates executable code including the one or more function calls mapped to the identified actions. This executable code may be used, for example, by failure simulator 134 of FIG. 1 to simulate a failure scenario on a distributed computing system, including the application servers 140 of FIG. 1 and physical or virtualized infrastructure components.

Example Simulation of a Failure Scenario Based on a Received Natural Language Definition of the Failure Scenario FIG. 4A illustrates an example natural language definition of a simulated failure scenario, according to an embodiment.

As illustrated, the natural language definition 410 of the simulated failure scenario may be defined such that a failure scenario definition is written in a format similar to a natural language input (e.g., sentences or sentence-like structures in the English language). Natural language definition 410 may include a number of key words associated with variables to set in the executable code that executes the simulated failure scenario, an action to perform to initiate the simulated failure scenario, conditions to be satisfied, and instructions to initiate a recovery from the simulated failure scenario. As illustrated, the key words associated with variables to set in the executable code for executing the simulated failure scenario may begin with the keyword "given" and continue until a different keyword is reached. In this illustration, the natural language definition 410 of the simulated failure scenario defines three variables to be set in the executable code: the name of an object of type "CloudInstance", the name of an object of type "LoadBalancer", and the name of an object of type "Alarm". These objects may be used in the executable code to inject a simulated failure on a distributed computing system and determine whether the system successfully recovered from the system failure.

The actions to perform on the distributed computing system to inject the simulated failure into the distributed computing system may begin with the keyword "when" and continue until a different keyword is reached. In this illustration the simulated failure scenario comprises a single action to perform—specifically, to terminate a specific process executing on a specific instance of an application server 140. However, it should be recognized that any number of actions may be specified in the natural language definition of the simulated failure scenario so that a simulated failure of any level of complexity may be executed against the distributed computing system.

The actions to perform on the distributed computing system to determine the outcome of the simulated failure scenario and compare the outcome of the simulated failure scenario to the expected failure scenario may begin with the keyword "then" and continue until the end of the natural language definition 410 of the simulated failure scenario. As illustrated, the actions to perform to determine the outcome of the simulated failure scenario may include verifying that the simulated failure scenario successfully injected the failure into the distributed computing environment after waiting for a first time period ("wait1"), initiating a recovery process after verifying that the simulated failure was successfully injected into the distributed computing environment, and verifying that the recovery process was successful after waiting for a second time period ("wait2") after initiating the recovery process.

Verification that the simulated failure scenario was successfully injected may include executing assertions comparing the number of healthy hosts to an expected number of healthy hosts and comparing an alarm state to a first expected alarm state. If either of these assertions fail, failure analysis system 130 can determine that the simulated failure was not successfully injected into the distributed computing system and terminate further execution of the simulated failure scenario before failure analysis system 130 can waste computing resources in an attempt to recover from a partially executed failure.

Verification that the recovery process successfully executed may include executing assertions comparing the number of healthy hosts to an expected number of healthy hosts and comparing an alarm state to a second expected alarm state. If either of these assertions fail, failure analysis system 130 can determine that the distributed computing system failed to successfully recover from the simulated system failure and can take action to inform developers of the failure, block code from being promoted to a production environment, revert code in a production environment to previous known good versions of code, and other actions that may be performed in response to determining that the application failed to recover from the simulated failure scenario.

Based on the failure scenario definition 410, failure analysis system 130 can simulate a system failure according to timeline 420 illustrated in FIG. 4B. As illustrated, timeline 420 starts with failure analysis system 130 injecting the simulated failure on a specified server. The injection of the simulated failure, according to the failure scenario definition 410, may correspond to the instructions to terminate a specified process on a specified instance of an application server 140.

To ensure that the failure was successfully introduced into the distributed computing system including the application servers 140, failure analysis system 130 may wait for a specified time at block 424 before transmitting post-failure status request message 426 to the application servers 140. The post-failure status request message 426 may be used to determine, for example, that an alarm has been generated in response to the simulated failure scenario and that the number of healthy servers corresponds to an expected number of healthy servers after injection of the simulated failure. At block 428, failure analysis system 130 determines that the simulated failure was executed. As discussed, the determination that the simulated failure was executed may be based on whether any assertions executed after injection of the simulated failure and before initiation of recovery processes failed (e.g., the comparison in an assertion resolves to Boolean FALSE).

In timeline 420, where the simulated failure was determined to have successfully executed, failure analysis system 130 transmits a message 430 to initiate a recovery procedure. As discussed, the transmission of message 430 may be performed automatically upon failure analysis system 130 of FIG. 1 determining that the simulated failure was successfully executed (e.g., determining that assertions comparing the state of the distributed computing system to an expected post-failure state of the computing system did not terminate execution of the simulated failure scenario). After initiation of the recovery procedure, failure analysis system 130 waits for a specified time at block 432 before transmitting post-recovery status request message 434 to the application servers 140. The post-recovery status request message 434 may be used to determine, for example, that an alarm has been cleared (e.g., that no alarm state exists) on the application servers 140 and that the number of healthy servers corresponds to an expected number of healthy servers after recovery from the simulated failure (e.g., that the number of health servers prior to the simulated failure and after recovery from the simulated failure match).

At block 436, failure analysis system 130 determines whether the recovery operation for the simulated failure was successful. As discussed, the determination of whether the recovery operation was successful may be based on whether any assertions executed after initiation of the recovery procedure failed. If the recovery was determined to be successful, information identifying that the application passed the simulated failure scenario may be saved to a repository; otherwise, the failure of the recovery from the simulated failure scenario may be used to generate alerts, block application code from being promoted to a production environment, revert code in a production environment to a previous version that has previously been verified, and/or other appropriate actions for managing deployment and development of the application.

Figure 5:
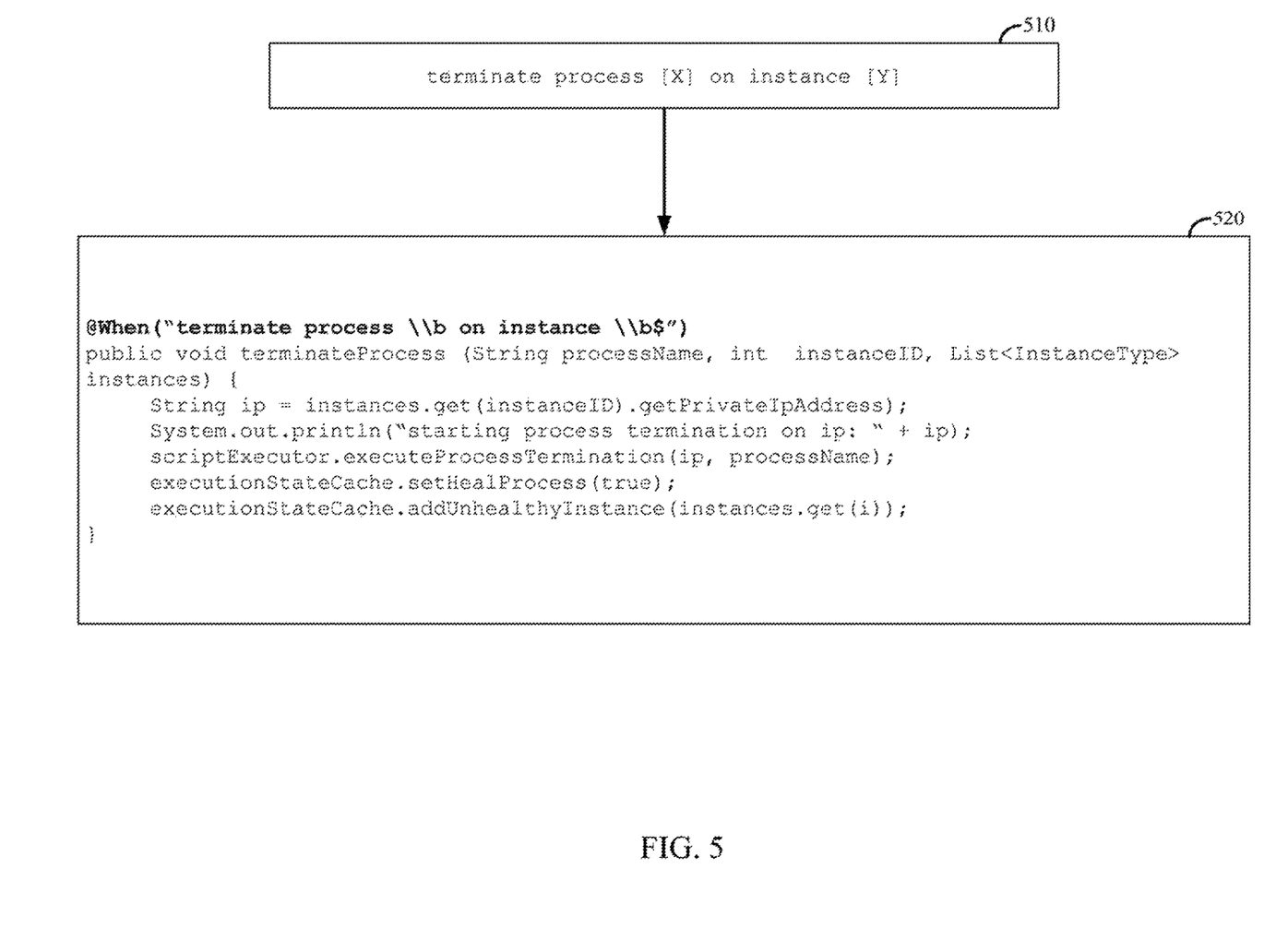
FIG. 5 illustrates an example mapping between a command in a domain specific language definition of a simulated failure scenario and computer-executable commands for executing an action associated with the command.

Example Mapping of Natural Language Inputs to
Executable Code for Simulating a Failure Scenario FIG. 5 illustrates an example mapping between a received command 510 in a domain-specific language definition of a failure scenario and executable code 520 for executing an action associated with the received command.

As illustrated, received command 510 may be a command defined in a domain-specific language that exposes natural language or natural language-like constructs that a user can use to invoke simulated failures in a computing environment. In this illustration, received command 510 may be used to invoke a failure involving the termination of a specified process X on a specified instance Y of a server. For example, if a user transmits the command "terminate process foo on instance 12345" to failure analysis system 130 for execution, received command 510, when mapped to a corresponding function in executable code 520, will cause process foo to be terminated on a server having the identifier 12345. Other mappings between domain-specific language commands and executable code may be defined in failure analysis system 130 as needed to simulate various failures in a distributed computing environment.

Executable code 520 generally defines processes, or functions, that are invoked when failure analysis system 130 receives a domain-specific language command in the form of received command 510 for execution. While executable code 520 illustrates a single definition of a function to be invoked when a command 510 is received, it should be recognized that executable code 520 may include functions defining the actions performed on a distributed computing system in response to the receipt of any number of defined commands. Each function defined in executable code 520 may be tagged or otherwise associated with the format of a domain-specific command 510 that triggers execution of the function. This information may, for example, be included in the "@When" directive in executable code 520 or mappings maintained outside of executable code 520 between a given domain-specific command 510 and the function in executable code 520 to invoke in response to receipt of the domain-specific command (e.g., in code defining a command dispatcher or other failure simulator system in a distributed computing system. As illustrated, the function "terminateProcess (String processName, int instanceID, List<InstanceType> instances)" may be invoked in response to receipt of a domain specific command in the form of received command 510 (i.e., in response to a received command in the form of "terminate process X on instance Y"), while other processes (not illustrated in FIG. 5) may be invoked in response to receipt of other domain-specific commands defined in failure analysis system 130.

Figure 6:
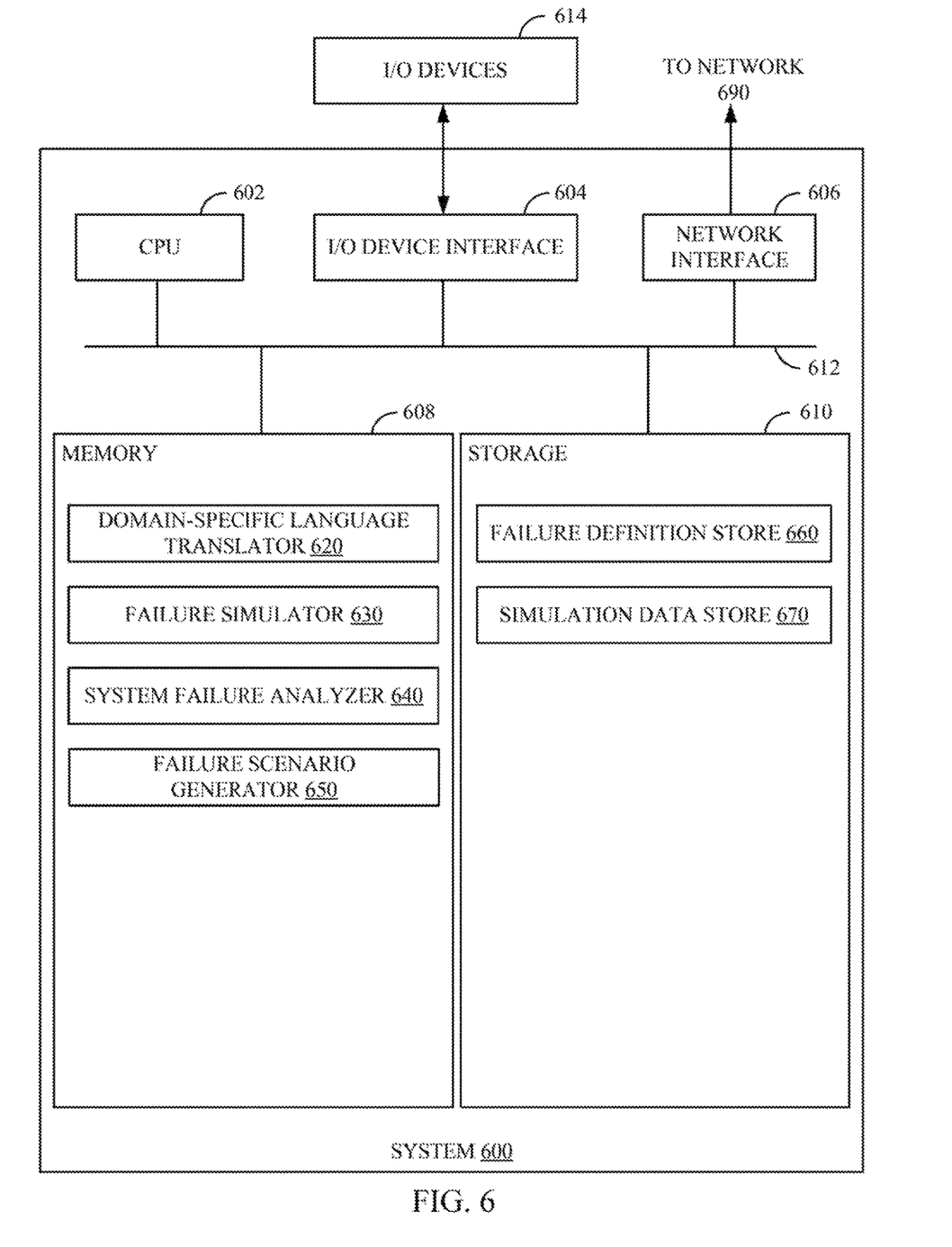
FIG. 6 illustrates an example computing system with which embodiments of the present disclosure may be implemented.

Example System for Application Failure Testing
Through Natural Language Inputs Defining a
Failure Scenario FIG. 6 illustrates an example system 600 for using natural language inputs defining simulated failure scenarios are to perform failure mode testing on an application executing in a distributed computing environment, according to embodiments of the present disclosure. For example, system 600 may be representative of failure analysis system 130 illustrated in FIG. 1.

As shown, system 600 includes a central processing unit (CPU) 602, one or more I/O device interfaces 604 that may allow for the connection of various I/O devices 615 (e.g., keyboards, displays, mouse devices, pen input, etc.) to the system 600, network interface 606 through which system 600 is connected to network 590 (which may be a local network, an intranet, the internet, or any other group of computing devices communicatively connected to each other), a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes domain-specific language translator 620, failure simulator 630, system failure analyzer 640, and failure scenario generator 650. Domain-specific language translator 620 generally receives a natural language input defining a failure scenario to simulate on application servers 140 or other infrastructure components in a distributed computing environment and generates commands for executing the simulated failure scenario on the distributed computing environment. As discussed, domain-specific language translator 620 can use mappings between keywords in a natural language, domain-specific input and functions to execute in order to invoke a failure on specified components in the distributed computing environment according to parameters included in the natural language input defining the failure scenario. Failure simulator 630 uses the generated commands to invoke a simulated failure scenario on specified application servers 140 and/or infrastructure components in a distributed computing environment. These commands may, for example, be transmitted to the application services 140 and/or infrastructure components via network interface 606. System failure analyzer 640 monitors the distributed computing environment during execution of the simulated failure scenario to determine whether the simulated failure was successfully introduced into the distributed computing environment, and if so, whether the application executing in the distributed computing environment was able to recover from the simulated failure scenario. Failure scenario generator 650 generally provides an interface that allows developers to request generation of randomized failure scenarios as part of a chaos engineering approach to testing a software application. These generated randomized failure scenarios may be provided to domain-specific language translator 620 to begin execution of the randomized failure scenario.

Storage 610, as illustrated, includes a failure definition store 660 and simulation data store 670. Failure definition store 660 generally provides a searchable repository in which mappings between natural language inputs and commands for executing a simulated failure scenario are stored. Failure definition store 660 may further include templates that system 600 can use to generate natural language failure scenario inputs for execution from a request to invoke a named failure scenario according to specified parameters. Simulation data store 670 generally provides a searchable repository in which a history of simulated failure scenarios executed on the distributed computing environment is stored, along with the results of each simulated failure scenario (e.g., whether the application passed or failed the simulated failure scenario).

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for executing failure tests on a distributed computing system, comprising:

receiving a request to invoke a failure in a distributed computing system, the request including identified properties of a simulated system failure and an expected outcome of the simulated system failure;

generating a failure scenario definition from the received request by inserting the identified properties of the simulated system failure and an expected outcome of the simulated system failure into a template associated with an identified type of failure and formatted according to the defined format, wherein:

the failure scenario definition comprises a natural language input specifying a failure scenario in a domain-specific language (DSL) defining a format in which simulated system failures are to be received;

generating commands directed to each of the identified systems to simulate a system failure on the identified systems according to the identified properties;

transmitting the generated commands to the identified systems;

monitoring the distributed computing system to record an outcome of the simulated system failure;

comparing the recorded outcome of the simulated system failure to the expected outcome of the simulated system failure; and upon determining that the recorded outcome and expected outcome of the simulated system failure differs, generating an alert identifying a difference between the recorded outcome and the expected outcome.

2. The method of claim 1, wherein the identified systems comprise systems associated with a development environment for an application executing on the distributed computing system.

3. The method of claim 2, further comprising: upon determining that the recorded outcome and expected outcome of the simulated system failure differs, blocking promotion of the application from the development environment to a production environment.

4. The method of claim 1, wherein receiving the failure scenario definition comprises receiving a random scenario generated by a random failure scenario generator.

5. The method of claim 1, wherein generating commands directed to each of the identified systems comprises:

mapping the properties of the simulated system failure in the failure scenario definition to functions for executing the simulated system failure.

6. The method of claim 1, wherein comparing the recorded outcome of the simulated system failure to the expected outcome of the simulated system failure comprises: mapping information about the expected outcome of the simulated system failure to one or more assertions comparing the expected outcome of the simulated system failure to the recorded outcome of the simulated system failure.

7. The method of claim 1, wherein comparing the recorded outcome of the simulated system failure to the expected outcome of the simulated system failure comprises comparing the recorded outcome of the simulated system failure to the expected outcome of the simulated system failure after a specified amount of time has elapsed from transmission of the generated commands to the identified systems.

8. The method of claim 1, wherein the properties of the simulated system failure comprise a specified performance degradation on the identified target systems, and wherein the expected outcome comprises deallocation of the identified target systems from the distributed computing system and instantiation of a corresponding number of replacement systems into the distributed computing system.

9. The method of claim 1, wherein generating commands directed to each of the identified systems to simulate a system failure on the identified systems comprises generating a set of commands to be executed sequentially to inject a failure on the identified systems, pauses to inject into the simulated system failure, and assertions comparing the outcome of the simulated system failure to an expected outcome of the simulated system failure.

10. The method of claim 9, wherein determining that the recorded outcome and expected outcome of the simulated system failure differs comprises determining that execution of the simulated system failure was interrupted by a failure of one of the assertions.

11. A system, comprising:
a processor; and
a memory having instructions stored thereon which, when executed by the processor, performs an operation for executing failure tests on a distributed computing system, the operation comprising:
receiving a request to invoke a failure in a distributed computing system, the request including identified properties of a simulated system failure and an expected outcome of the simulated system failure;
generating a failure scenario definition from the received request by inserting the identified properties of the simulated system failure and expected outcome of the simulated system failure into a template associated with an identified type of failure and formatted according to the defined format, wherein:
the failure scenario definition comprises a natural language input specifying a failure scenario in a domain-specific language (DSL) defining a format in which simulated system failures are to be received;
generating commands directed to each of the identified systems to simulate a system failure on the identified systems according to the identified properties;
transmitting the generated commands to the identified systems;
monitoring the distributed computing system to record an outcome of the simulated system failure;
comparing the recorded outcome of the simulated system failure to the expected outcome of the simulated system failure; and
upon determining that the recorded outcome and expected outcome of the simulated system failure differs, generating an alert identifying a difference between the recorded outcome and the expected outcome.

12. The system of claim 11, wherein the identified systems comprise systems associated with a development environment for an application executing on the distributed computing system, and wherein the operation further comprises: upon determining that the recorded outcome and expected outcome of the simulated system failure differs, blocking promotion of the application from the development environment to a production environment.

13. The system of claim 11, wherein receiving the failure scenario definition comprises receiving a random scenario generated by a random failure scenario generator.

14. The system of claim 11, wherein generating commands directed to each of the identified systems comprises: mapping the properties of the simulated system failure in the failure scenario definition to functions for executing the simulated system failure.

15. The system of claim 11, wherein comparing the recorded outcome of the simulated system failure to the expected outcome of the simulated system failure comprises: mapping information about the expected outcome of the simulated system failure to one or more assertions comparing the expected outcome of the simulated system failure to the recorded outcome of the simulated system failure.

16. The system of claim 11, wherein comparing the recorded outcome of the simulated system failure to the expected outcome of the simulated system failure comprises comparing the recorded outcome of the simulated system failure to the expected outcome of the simulated system failure after a specified amount of time has elapsed from transmission of the generated commands to the identified systems.

17. The system of claim 11, wherein the properties of the simulated system failure comprise a specified performance degradation on the identified target systems, and wherein the expected outcome comprises deallocation of the identified target systems from the distributed computing system and instantiation of a corresponding number of replacement systems into the distributed computing system.

18. The system of claim 11, wherein generating commands directed to each of the identified systems to simulate a system failure on the identified systems comprises generating a set of commands to be executed sequentially to inject a failure on the identified systems, pauses to inject into the simulated system failure, and assertions comparing the outcome of the simulated system failure to an expected outcome of the simulated system failure.

19. The system of claim 18, wherein determining that the recorded outcome and expected outcome of the simulated system failure differs comprises determining that execution of the simulated system failure was interrupted by a failure of one of the assertions.

20. A system, comprising:
a distributed computing system including a plurality of application servers; and
a failure analysis system configured to:
receiving a request to invoke a failure in a distributed computing system, the request including identified properties of a simulated system failure and an expected outcome of the simulated system failure;
generate a failure scenario definition from the received request by inserting the identified properties of the simulated system failure and expected outcome of the simulated system failure into a template associated with an identified type of failure and formatted according to the defined format, wherein:
the failure scenario definition comprises a natural language input specifying a failure scenario in a domain-specific language (DSL) defining a format in which simulated system failures are to be received;
generate commands directed to each of the identified systems to simulate a system failure on the identified systems according to the identified properties;
transmit the generated commands to the identified systems;
monitor the distributed computing system to record an outcome of the simulated system failure;
compare the recorded outcome of the simulated system failure to the expected outcome of the simulated system failure; and
upon determining that the recorded outcome and expected outcome of the simulated system failure differs, generate an alert identifying a difference between the recorded outcome and the expected outcome.

* * * * *